G. P. CLARK.
WHEELS FOR TRUCKS, CASTERS, &c.

No. 192,055. Patented June 19, 1877.

WITNESSES:
Allen Pease
Kate Pease

INVENTOR:
George P. Clark

UNITED STATES PATENT OFFICE.

GEORGE P. CLARK, OF WINDSOR LOCKS, CONNECTICUT.

IMPROVEMENT IN WHEELS FOR TRUCKS, CASTERS, &c.

Specification forming part of Letters Patent No. 192,055, dated June 19, 1877; application filed March 17, 1877.

*To all whom it may concern:*

Be it known that I, GEORGE P. CLARK, of Windsor Locks, in the county of Hartford and State of Connecticut, have invented certain new and useful Improvements in Wheels for Hand-Trucks, Casters, &c.; and I do hereby declare that the following specification, taken in connection with the drawings making a part of the same, is a full, clear, and exact description thereof.

Figure 1:
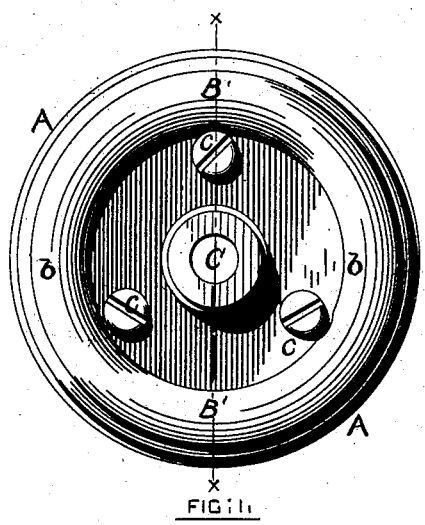
Figure 2:
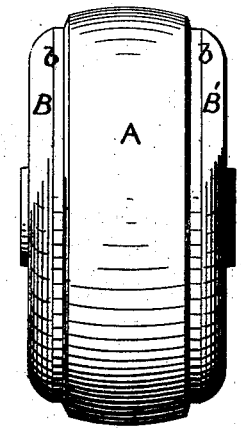
Figure 3:
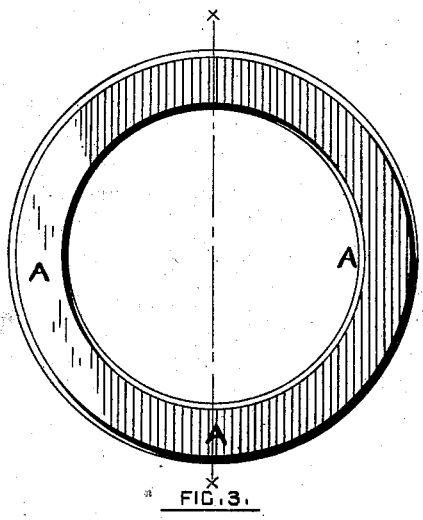

Figure 1 represents a side view of the wheel; Fig. 2, a view of its face; Fig. 3, a side view of the rubber ring; and Fig. 4, a transverse section of the complete wheel on line $x\ x$.

I am aware that rollers for floor-skates have been heretofore provided with non-sounding rims composed of rubber or other suitable material; but, in that connection, no requirement exists for such a construction of the roller or wheel as would render it suited for truck-rollers, casters, and other wheels for supporting and conveying heavy loads.

The object of my invention is to provide a wheel suitable for hand-trucks, furniture-casters, and similar service; and it consists, mainly, in a wheel composed of two compressing-disks, which are each provided with a section of hub, a peripherical flange, and an annular shoulder, in combination with an annular rim of vulcanized rubber or other non-sounding material, which is mounted upon the annular shoulders of the disks, and compressed between their flanges by means of screw-bolts.

My invention further consists in the combination, with a non-sounding compressible rim, of two metallic disks, each of which has an annular shoulder and a flange, which is inwardly beveled from its edge to its annular shoulder, whereby the rim mounted upon said shoulders between the flanges may, by compression between the disks, be forced or seated upon the shoulders of the disks, and compressed laterally for regulating the density of the compressible material of which the rim is composed.

So far as my knowledge extends, plain flanges have heretofore been used in this connection without annular shoulders and sections of hubs cast therewith, and these have either been combined with wooden centers or metallic bushings, and with neither of these modes of construction are the wheels suited to heavy weights, it being important for such service that one or both of the flanges should be provided with a hub cast therewith, in order that it may be properly supported on its axle.

Figure 4:
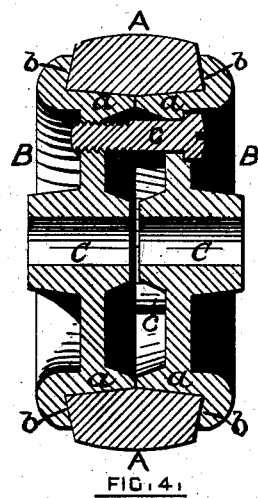

In the drawings, A represents a ring of rubber, which has been molded into the required form. This ring constitutes the rim of the wheel. B B' are two fellow disks of metal, and which are, severally, a central hub, provided with an annular shoulder, as at $a$, and a continuous radial flange, $b$, as shown at Fig. 4. C is a central hole, forming an axle-bearing, or trunnions to form an axle may be cast with the disks as a part thereof, as with either form of construction the disks will be securely maintained at right angles to the axis with which they are employed.

It will be observed that the inner faces of the flanges are made concave, or, in other words, each is beveled inwardly from its periphery to the annular shoulder, and that the sides of the rubber rim are made beveled or rounded to correspond therewith in shape. The central annular shoulders $a$ on the disks B B' are of the same diameter as the open center of the rubber ring.

When the wheel is made up the disks are placed opposite to each other, as shown in the drawings, and with their annular shoulders entered in the open center of the ring. These disks ought not to have their adjacent faces meet until they have been drawn together and the sides of the rubber ring compressed by the same bolts $c\ c\ c$, applied to fasten the two disks together in a well-understood way.

The effect of drawing the two disks together by the screw-bolts will be to cause the inwardly-beveled sides of the flanges to compress the yielding rubber ring sidewise, and also draw it radially inward toward the center of the wheel, and clamp it against the surface of the annular shoulders of both disks $a$, whereby the desirable result is obtained of securing the ring firmly, and also of reducing its resiliency to a minimum. In case the ring is not so compressed, and the rubber not deprived of considerable of its elasticity by condensation, the wheel would not be so useful as a truck-wheel, for the reason that its face would flatten under a heavy load, and the draft of the truck would be so greatly increased as to outweigh any advantage which would come from its being comparatively noiseless in rolling.

While I consider the concaved inner face of the flanges an important feature of construction, which performs the function of clamping the rubber rim to the face of the central hub, it is true that for wheels which are not required to sustain very heavy loads it can be dispensed with, and reliance had for compressing and holding the rubber rim upon the lateral pressure of straight-faced flanges.

It is apparent that wheels constructed as I have described can be very easily and cheaply supplied with new rims of rubber when the old ones have become too much worn, and, in place of rubber, any other suitable material which will deaden sound—as, for example, rawhide—can be employed.

It will also be seen that the disks, having hubs of their own, or being cast solidly with their axle, will always be truly maintained at right angles to the axle, and cannot twist thereon or be cramped, as is liable when mounted on opposite ends of a sleeve, or when they have no hubs, as heretofore constructed.

What I claim as my invention in wheels suitable for hand-trucks, casters, and other analogous uses is—

1. A wheel for hand-trucks, casters, &c., composed of two compressing-disks, each of which is provided with a peripherical flange, an annular shoulder, and a section of hub, in combination with an annular rim of vulcanized rubber or other non-sounding material, substantially as described.

2. The combination, with an annular compressible rim, of two metallic disks, each of which has an annular shoulder for supporting the rim, and an annular flange, which is beveled inward from its periphery to said shoulder, substantially as described.

GEORGE P. CLARK.

Witnesses:
  ALLEN PEASE,
  KATE PEASE.